(12) United States Patent
Garner et al.

(10) Patent No.: US 8,584,490 B2
(45) Date of Patent: Nov. 19, 2013

(54) LASER CUTTING METHOD

(75) Inventors: Sean Matthew Garner, Elmira, NY (US); Xinghua Li, Horseheads, NY (US)

(73) Assignee: Corning Incorporated, Corning, NY (US)

(*) Notice: Subject to any disclaimer, the term of this patent is extended or adjusted under 35 U.S.C. 154(b) by 232 days.

(21) Appl. No.: 13/030,605

(22) Filed: Feb. 18, 2011

(65) Prior Publication Data

US 2012/0211923 A1 Aug. 23, 2012

(51) Int. Cl.
*C03B 33/09* (2006.01)
*C03B 33/023* (2006.01)

(52) U.S. Cl.
USPC .............. 65/112; 219/121.67; 219/121.69; 219/121.6

(58) Field of Classification Search
None
See application file for complete search history.

(56) References Cited

U.S. PATENT DOCUMENTS

| | | | |
|---|---|---|---|
| 5,220,358 A | 6/1993 | Brown et al. ................. 351/159 |
| 5,609,284 A | 3/1997 | Kondratenko ................... 225/1 |
| 5,622,540 A * | 4/1997 | Stevens .......................... 65/112 |
| 5,776,220 A * | 7/1998 | Allaire et al. .................. 65/112 |
| 6,744,009 B1 * | 6/2004 | Xuan et al. ............... 219/121.67 |
| 6,811,069 B2 | 11/2004 | Hauer et al. .................. 225/93.5 |
| 6,815,070 B1 | 11/2004 | Bürkle et al. ............... 428/425.6 |
| 7,014,082 B2 | 3/2006 | Hauer et al. .................. 225/93.5 |
| 2005/0029321 A1 * | 2/2005 | Hauer et al. .................. 225/93.5 |
| 2005/0115678 A1 | 6/2005 | Vesci et al. ................ 156/345.49 |
| 2005/0142321 A1 | 6/2005 | Miyahara et al. ............. 428/64.2 |
| 2007/0039932 A1 | 2/2007 | Haase et al. ............. 219/121.67 |
| 2007/0062921 A1 * | 3/2007 | Karube et al. ............ 219/121.72 |
| 2007/0144656 A1 | 6/2007 | Muromachi et al. .......... 156/108 |
| 2007/0151962 A1 | 7/2007 | Doll et al. ................ 219/121.72 |
| 2008/0085401 A1 * | 4/2008 | Garner et al. .................. 428/192 |
| 2011/0250423 A1 * | 10/2011 | Fukasawa et al. ............. 428/220 |

FOREIGN PATENT DOCUMENTS

| | | | |
|---|---|---|---|
| EP | 0528112 | 2/1993 | ................ C02C 1/06 |
| EP | 1048628 | 4/1999 | .............. C03C 17/32 |
| EP | 1150927 | 1/2000 | .............. C03C 17/32 |
| EP | 1137607 | 4/2000 | .............. C03C 12/32 |
| EP | 1341730 | 12/2001 | .............. C03B 33/09 |
| EP | 1803601 | 4/2009 | .............. B60J 10/00 |
| GB | 1254120 | 11/1971 | ............... B28D 1/22 |

(Continued)

OTHER PUBLICATIONS

D. Hélie and R. Vallée, "Micromachining of thin glass plates with a femtosecond laser," Proc. SPIE 7386, Photonics North 2009, 738639 (Aug. 4, 2009).*

(Continued)

*Primary Examiner* — Matthew Daniels
*Assistant Examiner* — Lisa Herring
(74) *Attorney, Agent, or Firm* — Jeffrey A. Schmidt (57) ABSTRACT

A method for cutting a sheet of material having a thickness of at most 400 μm using an electromagnetic wave beam (EWB) such as a laser. The method comprises forming a surface initiation defect and irradiating the sheet along a predetermined path within a short distance from the initiation defect a scanning EWB, such that the sheet is heated and cooled to allow for the propagation of the initiation defect into the predetermined path, and further along the predetermined path to result in a separation of the sheet along the predetermined irradiation path. This method can be advantageously used to cut glass sheets having a thin thickness to result in high-quality edge substantially free of major defects carried over from the initiation defect.

19 Claims, 5 Drawing Sheets

(56) References Cited

FOREIGN PATENT DOCUMENTS

| | | | |
|---|---|---|---|
| JP | 2002-192367 | 7/2002 | |
| JP | 2003-002676 | 1/2003 | |
| JP | 2007-319888 | 12/2007 | |
| KR | 2005133407 A * | 12/2005 | |
| WO | WO00/41978 | 7/2000 | ............... C03C 17/32 |
| WO | WO00/66507 | 11/2000 | ............... C03C 17/32 |
| WO | WO2005/000762 | 6/2005 | ............... C03C 27/06 |
| WO | WO2005/115678 | 8/2005 | ............... B23K 26/40 |
| WO | WO2007/079847 | 7/2007 | ............... C03B 33/09 |
| WO | WO2008/077042 | 6/2008 | ............... C09D 4/00 |
| WO | WO2008/104825 | 9/2008 | ............... C03C 17/00 |
| WO | WO2008/136872 | 11/2008 | ............ H01L 31/042 |
| WO | WO 2010074091 A1 * | 7/2010 | |

OTHER PUBLICATIONS

K. Karube, N. Karube, "Laser-induced cleavage of LCD glass as full-body cutting", Proc. SPIE, vol. 6880, 688007-1 to 688007-10 (2008).

* cited by examiner

LASER CUTTING METHOD

FIELD

The present invention relates to methods for separating a sheet of brittle material. In particular, the present invention relates to methods for cutting a thin sheet of brittle material using an electromagnetic wave beam (EWB). The present invention is useful, e.g., in cutting thin glass sheets having a thickness not higher than 400 µm into desired shapes for use in display industries.

TECHNICAL BACKGROUND

Glass sheets have been used in the manufacture of display devices such as LCD TVs, computer monitors and handheld devices. For example, in a modern LCD TV set, a piece of thin glass sheet with pristine surface quality is used as a substrate for TFT and other electronic devices, and another piece is used as a substrate for the color filter. Recently, thin glass sheets started to find use as cover sheets for the screens of handheld devices and TV sets as well.

The thin glass sheets are typically made by using a fusion down-draw process, which is pioneered by Corning Incorporated, Corning, N.Y., U.S.A. (hereinafter "Corning Incorporated"), a float forming process, or other forming methods, from glass melt. Because these forming processes are typically continuous on an industrial scale, as-formed glass ribbons immediately exiting the forming facility normally need to be cut into multiple, discreet glass sheets before being shipped to device manufacturers. Furthermore, the as-cut glass sheets produced at the glass forming production lines normally have sizes that can accommodate the manufacture of multiple devices on the same surface simultaneously. At a certain point of time, such large glass sheets need to be cut into smaller size of the final devices.

One traditional approach for cutting continuous glass ribbons and large glass sheets comprises a first step of forming a scribe-line on a surface by using a mechanical scoring wheel, followed by bending the glass ribbon or sheet along the score-line so that smaller, discreet glass sheets are separated from the mother ribbon or sheet. This method has been used for making glass sheets having a relatively large thickness, such as 1.0 mm, 700 µm and 600 µm, successfully. Another approach demonstrated to be effective uses a laser beam for forming the score-line in the first step, followed by bending and separation. Usually, during the first laser scoring step, a laser beam is projected to the glass sheet surface, which is absorbed by the glass sheet, thereby heating the glass sheet to an elevated temperature. Normally, a cooling fluid jet, such as water jet or air jet, is then applied to the heated surface, causing a tensile stress, which, if significant enough, can cause a pre-formed initiation defect on the glass to propagate into a score-line with a given depth.

Currently, the demand of ever lighter display devices have pushed the glass substrates for display devices toward ever lower thicknesses, such as 400 µm, 300 µm, 200 µm, 100 µm and even lower. It has been found that, for glass sheets with such thin thicknesses, the score-and-break process, whether involving a laser scoring or mechanical scoring step, cannot be utilized to consistently and reliably produce glass sheets with high-quality edges.

Laser full-body cutting processes were proposed previously for cutting thin glass sheets. However, reliability and edge quality of those processes need further improvement. In addition, those processes can be very complex.

Hence, there is a need of a reliable thin glass sheet cutting method. The present invention meets this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus, a first aspect of the present invention relates to a process for cutting a sheet of brittle material having a thickness of at most 400 µm defined by a first major surface and a second major surface opposing the first major surface, comprising the following steps:

(I) providing the sheet having a temperature $T1$;

(II) providing an electromagnetic wave beam having a wavelength absorptive by the brittle material;

(III) projecting the electromagnetic wave beam onto the first major surface to have a footprint on the first major surface at a given time;

(IV) providing an initiation defect on the first surface and/or the second surface;

(V) scanning the electromagnetic wave beam along a predetermined path on the first major surface to heat the brittle material along the path to a temperature $T2$ without using a cooling jet trailing the electromagnetic wave beam, said predetermined path having a distance from the surface defect in the range of from 10 µm to 5 mm; in certain embodiments from 20 µm to 3 mm, in certain other embodiments from 30 µm to 1 mm, in certain embodiments from 50 µm to 500 µm; and (VI) allowing the defect to propagate into the path and extend along the path such that a portion of the brittle material sheet separates from the remainder of the sheet.

In certain embodiments of the first aspect of the present invention, in step (I), the sheet is placed in a substantially horizontal position.

In certain embodiments of the first aspect of the present invention, in step (I), the sheet is placed in a substantially vertical position.

In certain embodiments of the first aspect of the present invention, in step (I), $T1$ is not higher than 300° C., in certain embodiments not higher than 200° C., in certain embodiments not higher than 150° C., in certain other embodiments no higher than 100° C., in certain embodiments not higher than 50° C., in certain embodiments not higher than 30° C.

In certain embodiments of the first aspect of the present invention, the brittle material has a CTE at room temperature of at least $1.0 \times 10^{-6} \cdot K^{-1}$, in certain embodiments at least $2.0 \times 10^{-6} \cdot K^{-1}$, in certain embodiments at least $3.0 \times 10^{-6} \cdot K^{-1}$, in certain other embodiments at least $4.0 \times 10^{-6} \cdot K^{-1}$, in certain other embodiments at least $5.0 \times 10^{-6} \cdot K^{-1}$.

In certain embodiments of the first aspect of the present invention, in step (VI), the portion of the brittle material sheet separates from the remainder of the sheet in a spontaneous manner.

In certain embodiments of the first aspect of the present invention, in step (II), the electromagnetic wave beam is a laser beam.

In certain embodiments of the first aspect of the present invention, in step (II), the laser beam is a $CO_2$ laser beam, a YAG laser beam, a fiber laser, or a semiconductor laser.

In certain embodiments of the first aspect of the present invention, in step (II), the electromagnetic wave beam is provided by an infrared lamp.

In certain embodiments of the first aspect of the present invention, in step (I), the brittle material is a glass or glass-ceramic material.

In certain embodiments of the first aspect of the present invention, in step (II), the footprint of the electromagnetic wave on the first major surface is substantially circular.

In certain embodiments of the first aspect of the present invention, in step (II), the footprint of the electromagnetic wave beam has a diameter of at most 10 mm, in certain embodiments at most 8.0 mm, in certain embodiments at most 5.0 mm, in certain other embodiments at most 3.0 mm, in certain embodiments at most 1.0 mm, in certain other embodiments at most 500 μm.

In certain embodiments of the first aspect of the present invention, in step (II), the footprint of the electromagnetic wave beam is elliptical and has a short axis aaa and a long axis bbb, wherein bbb is at most 10 mm, in certain embodiments at most 8.0 mm, in certain embodiments at most 5.0 mm, in certain other embodiments at most 3.0 mm, in certain embodiments at most 1.0 mm, in certain other embodiments at most 500 μm.

In certain embodiments of the first aspect of the present invention, in step (IV), the initiation defect is formed on the first major surface only.

In certain embodiments of the first aspect of the present invention, in step (IV), the initiation defect is formed on the second major surface only.

In certain embodiments of the first aspect of the present invention, in step (IV), the initiation defect is formed on both the first and second surfaces.

In certain embodiments of the first aspect of the present invention, in step (IV), the initiation defect is formed throughout the thickness of the sheet of the brittle material.

In certain embodiments of the first aspect of the present invention, in step (IV), the initiation defect is formed by irradiating an electromagnetic wave beam to the area of the surface at which the initiation surface is formed.

In certain embodiments of the first aspect of the present invention, in step (IV), the initiation defect is formed by mechanical scribing.

In certain embodiments of the first aspect of the present invention, step (IV) is carried out prior to step (V).

In certain embodiments of the first aspect of the present invention, step (IV) is carried out during or immediately after the completion of step (V).

In certain embodiments of the first aspect of the present invention, in step (V), the footprint of the electromagnetic wave beam does not cover a part of the initiation defect.

In certain embodiments of the first aspect of the present invention, in step (V), the predetermined path forms a closed loop.

In certain embodiments of the first aspect of the present invention, in step (V), the initiation defect falls outside of the area defined by the closed loop.

In certain embodiments of the first aspect of the present invention, in step (V), the predetermined path extends from one edge of the sheet of the brittle material to another edge of the sheet of the brittle material.

In certain embodiments of the first aspect of the present invention, in step (V), the footprint of the electromagnetic wave beam on the first major surface comprises a center that moves in substantially the same direction at least in a complete scanning cycle of the predetermined path.

In certain embodiments of the first aspect of the present invention, step (V) comprises scanning the electromagnetic wave beam for multiple scanning cycles of the predetermined path before step (VI) is carried out.

In certain embodiments of the first aspect of the present invention, in step (V), the center of the footprint of the electromagnetic wave beam has a speed of at least 1 m·s$^{-1}$, in certain embodiments at least 3 m·s$^{-1}$, in certain other embodiments at least 5 m·s$^{-1}$, in certain other embodiments at least 8 m·s$^{-1}$, in certain other embodiments at least 10 m·s$^{-1}$, in certain embodiments at least 15 m·s$^{-1}$, in certain other embodiments at least 20 m·s$^{-1}$, in certain other embodiments at least 30 m·s$^{-1}$, in certain other embodiment at least 40 m·s$^{-1}$, in certain other embodiments at least 50 m·s$^{-1}$.

In certain embodiments of the first aspect of the present invention, in step (V), the average power density of the footprint of the electromagnetic wave beam is from 1 to 100 W·cm$^{-2}$, in certain embodiments from 2 to 80 W·cm$^{-2}$, in certain embodiments from 3 to 70 W·cm$^{-2}$, in certain embodiments from 4 to 60 W·cm$^{-2}$, in certain other embodiments from 5 and 50 W·cm$^{-2}$.

In certain embodiments of the first aspect of the present invention, in step (V), the footprint of the electromagnetic wave beam on the first major surface comprises a center that moves in an oscillating manner.

In certain embodiments of the first aspect of the present invention, in step (V), the footprint of the electromagnetic wave beam on the first major surface forms an elongated synthetic beam comprising a center that moves in substantially the same direction at least in a complete scanning cycle of the predetermined path.

In certain embodiments of the first aspect of the present invention, in step (V), the synthetic beam is formed by oscillating the electromagnetic wave beam.

In certain embodiments of the first aspect of the present invention, in step (V), at least one of the following is used for oscillating the electromagnetic wave beam:
(i) a piezoelectric mirror;
(ii) a galvometric mirror; and
(iii) a voice coil activated mirror.

In certain embodiments of the first aspect of the present invention, step (V) comprises adjusting at least one of (i) the shape; (ii) the dimension; (iii) the oscillation frequency; and (iv) average power density of the synthetic beam.

In certain embodiments of the first aspect of the present invention, at least one of the following is used for adjusting at least one of (i) the shape; (ii) the dimension; and (iii) the oscillation frequency of the synthetic beam:
(a) a piezoelectric mirror;
(b) a galvometric mirror; and
(c) a voice coil activated mirror.

In certain embodiments of the first aspect of the present invention, step (V) comprises scanning the center of the synthetic beam for multiple scanning cycles of the predetermined path before step (VI) is carried out.

In certain embodiments of the first aspect of the present invention, step (V) comprises scanning the center of the synthetic beam for less than two scanning cycles of the predetermined path before step (VI) is carried out.

In certain embodiments of the first aspect of the present invention, in step (V), the center of the synthetic beam has a speed of at most 10 m·s$^{-1}$, in certain embodiments at most 5 m·s$^{-1}$, in certain other embodiments at most 1 m·s$^{-1}$, in certain other embodiments at most 0.5 m·s$^{-1}$, in certain other embodiment at least 0.3 m·s$^{-1}$, in certain other embodiments at least 0.1 m·s$^{-1}$.

In certain embodiments of the first aspect of the present invention, in step (V), the average power density of the synthetic beam is from 1 to 100 W·cm$^{-2}$, in certain embodiments from 2 to 80 W·cm$^{-2}$, in certain embodiments from 5 to 60 W·cm$^{-2}$, in certain embodiments from 10 to 50 W·cm$^{-2}$, in certain other embodiments from 20 to 40 W·cm$^{-2}$.

In certain embodiments of the first aspect of the present invention, the brittle material is a glass having a strain point Tstrain, and in step (V), T2<Tstrain, in certain embodiments T2<Tstrain−100° C., in certain other embodiments T2<Tstrain−200° C.

In certain embodiments of the first aspect of the present invention, in step (V), T2−T1≥200° C., in certain embodiments T2−T1≥300° C., in certain embodiments T2−T1≥400° C.

In certain embodiments of the first aspect of the present invention, both steps (V) and (VI) are carried out in the presence of an ambient atmosphere.

In certain embodiments of the first aspect of the present invention, the ambient gas is selected from: air, N$_2$, He, Ar, and mixtures and combinations thereof.

In certain embodiments of the first aspect of the present invention, the edge of the portion of the separated sheet along the predetermined path is free from major defects.

In certain embodiments of the first aspect of the present invention, the brittle sheet comprises functional devices formed on at least one of the first surface and the second surface.

In certain embodiments of the first aspect of the present invention, the brittle sheet comprises functional devices formed the second surface only.

In certain embodiments of the first aspect of the present invention, the brittle sheet comprises functional devices formed on at least one of the first surface and the second surface having a distance DDD from the predetermined path, where 0.1 mm≤DDD≤10 mm, in certain embodiments 0.5 mm≤DDD≤8 mm, in certain embodiments 0.8 mm≤DDD≤8 mm, in certain other embodiments 1.0 mm≤DDD≤6 mm.

A second aspect of the present invention relates to a process for cutting a sheet of brittle material having a thickness of at most 400 μm, a first major surface and a second major surface opposing the first major surface, comprising the following steps:

(A) providing the sheet having a temperature T1;

(B) providing an electromagnetic wave beam having a wavelength absorptive by the brittle material;

(C) projecting the electromagnetic wave beam onto the first major surface to have a footprint on the first major surface at a given time, and oscillating the electromagnetic wave beam to form an elongated synthetic beam;

(D) providing an initiation defect on the first surface and/or the second surface;

(E) scanning the synthetic beam along a predetermined path on the first major surface to heat the brittle material along the path to a temperature T2 without using a cooling jet trailing the electromagnetic wave beam, said predetermined path having a distance from the initiation defect in the range of from 0 μm to 5 mm; in certain embodiments from 10 μm to 3 mm, in certain embodiments from 20 μm to 3 mm, in certain other embodiments from 30 μm to 1 mm, in certain embodiments from 50 μm to 500 μm; in certain embodiments from 100 μm to 1 mm; in certain other embodiments from 100 μm to 500 μm; and (F) allowing the defect to propagate into the path and extend along the path such that a portion of the brittle material sheet separates from the remainder of the sheet spontaneously.

In certain embodiments of the process according to the second aspect of the present invention, in step (V), the initiation defect is located within the predetermined path.

One or more embodiments of the present invention have one or more of the following advantages. First, because of the full-body cutting effect, the invention reduces the number of process steps in the process, thereby significantly simplifies the cutting process compared to score-and-break processes. Second, the inventive method enables free-shape cutting of thin sheets with non-linear edges. For example, rectangular pieces of sheets with round corners, which are more shatter-resistant than those with right angle corners, can be easily produced using the inventive method. Third, due to the ability to precisely control the scanning path geometry and dimension, one can use the inventive process for cutting sheets on which devices sensitive and vulnerable to exposure to high temperature, such as transistors, wires, optical devices, along predetermined paths at a relatively small distance from those devices, without overheating the adjacent devices. In addition, with respect to the first aspect of the present invention, another advantage is the capability of cutting pieces from a mother sheet, such as a glass sheet, with superior edge quality.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a laser beam" includes embodiments using one, two or more such laser beams, unless the context clearly indicates otherwise.

In the present disclosure, a novel and effective method for cutting a thin sheet of brittle material is provided. The brittle material is desirably elastic at around room temperature and can be, e.g., a glass material, a glass-ceramic material, or a crystalline material. The brittle material may comprise a single-layer having a substantially homogenous chemical composition, or multiple layers bonded together, each having a unique chemical composition. The following description will be given in the context of cutting a thin glass sheet. However, one having ordinary skill in the art, upon exposure to the teaching herein, should understand the same process and equipment can be adapted for cutting other materials as well, mutatis mutandis.

Figure 1:
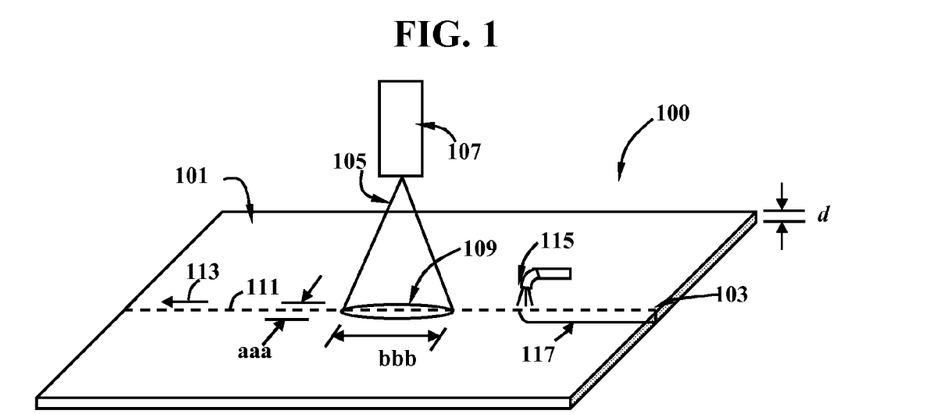
FIG. 1 is a schematic illustration of a conventional laser scoring process.
Figure 2:
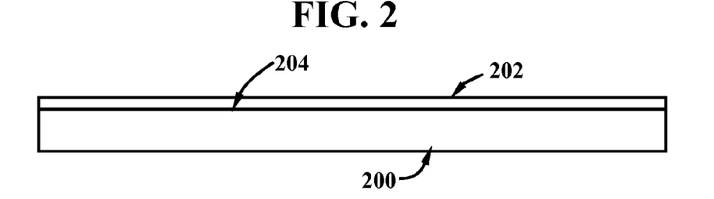
FIG. 2 is a schematic illustration of a cross-section of a glass sheet after completion of the scoring process illustrated in FIG. 1.

Laser scoring processes have been developed previously for scoring and breaking of thick glass sheets such as those having a thickness of about 700 μm. FIGS. 1 and 2 schematically illustrate an example of such process. As shown in FIG. 1, on a first surface 101 of a glass sheet 100 having a thickness d, an initiation defect 103 is first formed, typically along the edge, by laser irradiation or scribing by a mechanical wheel. Afterwards, a laser beam 105, such as a $CO_2$ laser beam emitted from a laser generator 107, is projected to the surface 101 of the glass sheet leaving a footprint 109, which is scanned along a narrow zone of the glass sheet along a score-line 111 in the direction 113 from one edge to the other, which typically passes through the pre-formed defect 103, thereby heating the exposed area to a high temperature. A cooling jet 115, such as a water jet or a cooling air jet, typically trailing the laser beam footprint 109, immediately cools down the heated surface area. The quenching produces tensile stress on the glass surface, which causes the initial defect 103 to propagate along the score-line to form a vent-line 117. If the vent-line penetrates the full depth d of the glass sheet, a full-body laser cutting results. If the vent-line does not penetrate the full depth d, the glass sheet is typically subsequently bent along the vent-line (which is the score-line) to effect a separation along the score-line. FIG. 2 schematically illustrates the cross-section of a relatively thick glass sheet after laser scoring as shown in FIG. 1. On a first major surface 202 of the glass substrate 200, a continuous vent-line 204 is formed extending from one edge to the other. Because the depth of the vent-line 204 is smaller than the thickness of the glass sheet 200, a spontaneous separation of the glass sheet typically does not occur when the glass is held substantially flat. In a subsequent step, the glass sheet can be bent along the vent-line 204 by application of a mechanical moment, whereby a separation would occur to yield two discrete glass sheets.

While the above conventional laser-scoring processes have been used successfully for score-and-break of glass sheets with relatively large thickness, such as those thicker than about 500 μm, they cannot be reliably used for glass sheets having a low thickness, such as those with a thickness of 200 μm or less. In addition, the use of the cooling jet complicates the apparatus and process.

Furthermore, traditional laser score-and-break and full-body cutting processes typically form an initiation defect in the path of the laser beam. As a result, part of the initiation defect is carried over to the formed edge, reducing the edge strength and quality.

A first aspect of the present invention utilizes a full-body cutting method that results in high-edge quality that is typically free from defects carried over from the initiation defect. The present invention is particularly advantageous for use in connection with glass sheet having a thickness of at most 400 μm, especially those having a thickness at most 300 μm, in certain embodiments at most 200 μm, in certain embodiments at most 100 μm, in certain embodiments at most 50 μm. In certain preferred embodiments, the glass sheet is a borosilicate glass sheet having a thickness of at most 200 μm. The thin thickness of at most 400 μm lends in part to the consistency and repeatability of the process of the present invention. Such thin glass sheets can be formed by any method known in the field, e.g., fusion down-draw, slot down-draw, float process, up-draw, rolling, pressing, and the like, with or without the additional thinning and surface finishing steps such as polishing or chemical composition and surface texture modification. The fusion down-draw process pioneered by Corning Incorporated as is known in the art can be advantageously used to make glass sheets having pristine surface quality without the need of surface polishing, which are particularly suitable for use in the present invention to make glass sheets having various shapes and dimensions for use in a wide varieties of applications and industries, such as LCD displays, OLED displays, TV, computer monitor and hand-held device cover glass sheets, appliance glass cover sheets, photovoltaic glass substrates, automobile windshield glass, building glass panes, and the like.

Similar to conventional laser scoring and cutting methods, the process of the present disclosure depends on the tensile stress caused by local heating and cooling to effect the propagation of a pre-formed initiation defect, and hence the resulting full-body separation. The glass sheet as provided for cutting by the present invention has a temperature T1 at which the glass sheet is substantially elastic. A relatively large-size elastic glass sheet without initiation defect typically would not break if bent slightly, due to its flexibility. As a matter of fact, one of the major factor contributing to the commercial success of fusion down-draw-formed glass sheet is the high strength imparted by the high surface quality and lack of defect thereof because of the uniqueness of the forming condition.

Thus, the EWB heats the glass sheet located along the intended separation line, i.e., a predetermined exposure path, to a temperature significantly higher than T1. To effect the heating, the EWB must be absorptive to the glass sheet intended to be cut. When an EWB is projected onto a first surface of a glass sheet, part of it would be reflected back, and part of it would transmit into the bulk of the glass sheet. The part transmitted into the bulk would then be partly absorbed, and partly transmitted out of the bulk due to refraction at the opposite surface. The coefficient of absorption of the glass sheet of the beam should advantageously result in the energy of the beam transmitted out of the bulk based on the index of refraction at the opposite surface constituting less than 30%, in certain embodiments less than 20%, in certain other embodiments less than 10%, in certain other embodiments less than 5%, in certain other embodiments less than 1%, of the total energy of the EWB projected onto the first surface of the glass sheet. The EWB can exhibit a wavelength at a given range, such being the case for a white light beam, and an infrared beam emitted by a typical infrared lamp. In certain embodiments, the EWB can exhibit a very narrow wavelength span, such being the case for an infrared laser beam, such as a $CO_2$ laser. The EWB can be a microwave beam as well. Normally, the higher the absorption coefficient of the EWB by the glass material, the lower the depth the EWB can penetrate into the bulk of the glass sheet. For example, typical borosilicate glass substrates for LCDs, such as Eagle XG® glass sheets made by Corning Incorporated, is known to have a strong absorption of $CO_2$ laser having a wavelength of 10.6 μm, so much so that the penetration thereof is typically limited to within the first 50 μm or so of a 400 μm glass sheet.

Akin to the conventional laser scoring process, the EWB used in the present invention process can be projected to the first major surface of a glass sheet directly from a beam emitter such as a laser generator, a lamp or a microwave emitter, or through a beam modifier, such as lenses, to achieve the desired footprint geometry, size and energy intensity distribution. The beam modifier can have a fixed set-up such that the EWB footprint on the glass sheet remains substantially stable. Alternatively, the beam modifier can be equipped with certain components that can control and alter the EWB footprint intermittently or continuously. As used herein, a "footprint" of an EWB is the area of the cross-section of the EWB when intercepted by the first surface of the glass sheet.

An initiation defect is formed typically on a surface of the glass sheet to facilitate the separation of the glass sheet by using the method of the present invention. Such defect is needed for a consistent spontaneous full-body cutting. As used herein, "spontaneous separation" means the separation is caused primarily by the stress profile caused by the heating by the EWB and cooing effect. While it is possible that in the present invention the separation of the sheet is effected by external intervention, such as pushing or pulling by using suction cups and like devices, it is in general desirable and probable that the separation of the sheet is spontaneous in step (VI) of the present invention. The initiation defect can be linear in certain embodiments, or take the shape of a point or a circle in other embodiments. If linear, the defect can point in a direction toward substantially the center of the predetermined path where the path forms a closed loop, or it can be angled toward the predetermined path in its vicinity. Thus, in certain embodiments, the extension of the initiation defect intersects with the predetermined path to form an angle theta, wherein $45° \leq theta \leq 135°$, in certain embodiments $60 \leq theta \leq 120°$, in certain other embodiments $75 \leq theta \leq 105°$.

The EWB is scanned onto the first surface of the glass sheet using means to be detailed infra The predetermined scanning path determines the size and geometry of the final part cut from the mother glass sheet. Normally, the glass sheet would be cut and separated along the predetermined path. As to be indicated infra, the present invention process is capable of cutting a part from a glass sheet with various shapes, such as rectangular, rectangular with substantially round corners, circular, elliptical, and the like, because the predetermined path can be followed by the scanning EWB by using various methods and controlling mechanisms. Due to the absorption of the EWB energy by the glass material, the radiated area and the vicinity thereof is heated to a temperature higher than T1. The predetermined path and the initiation defect are chosen such that there is a distance between them in the range of from 10 μm to 5 mm, in certain embodiments from 20 μm to 3 mm, in certain other embodiments from 30 μm to 1 mm, in certain embodiments from 50 μm to 500 μm.

Figure 3A:
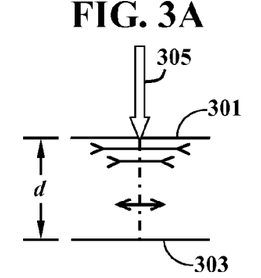
FIGS. 3A, 3B and 3C are schematic illustrations of the stress profile across the thickness of a cross-section of a glass sheet during and immediately after the exposure to a laser beam.
Figure 3B:
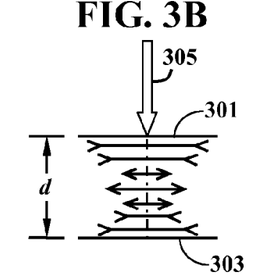
Figure 3C:
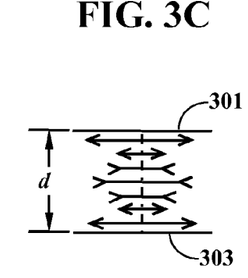

The heating and heat-transfer process in the present invention, akin to what occurs in a conventional laser scoring or laser full-body cutting process, is quite complex. This heat transfer process induces the desired stress distribution along the pre-determined radiation path, which facilitates the propagation of the initiation defect into the predetermined path, and further along the predetermined path. FIGS. 3A, 3B and 3C schematically illustrate the heat transfer process and stress profile evolution of a glass sheet having a first surface 301, a second surface 303 opposing the first surface 301, and a depth d. In FIG. 3A, irradiation of the first surface 301 by as laser beam 305 starts, resulting in a significantly higher temperature on the surface 301 than on the counterpart area on surface 303. This results in compressive stress in proximity to the first surface 301 and tensile stress in proximity to the second surface 303. Next, as the heat is transferred through the thickness, and both surfaces are heated to an elevated temperature, as shown in FIG. 3B, the center of the thickness tends to exhibit a tensile stress and both surface regions exhibit compressive stresses at a various levels. Finally, at the end of the laser exposure, as shown in FIG. 3C, due to heat dissipation as a result of the cooling effect caused by cooler ambient atmosphere, both surface regions of the glass sheet exhibit lower temperatures than the center depth, resulting in surface tensile stress and center compressive stress. The stress profile can be relatively easily established for a thin glass sheet with a thickness of at most 400 μm because its capacity to store heat is limited. The surface tensile stress facilitates the propagation of defects in the vicinity of the stress profile. Thus, in the present invention, as a result of the heating effect by the exposure to EWB and the cooling effect of the ambient atmosphere of a media that the sheet rests on, the pre-formed initiation defect can propagate into the predetermined EWB exposure path, and further along the path, to finally result in a full-body cut of the glass sheet.

During the EWB cutting process according to the present invention, the glass sheet may be placed in various positions, such as a substantially horizontal position, a substantially vertical position, or a position in between. During the process, the stabilization of the glass sheet can be achieved by a support device, such as a table, an air table, an air bearing, edge clamping devices, suction cups, edge rollers, and the like. If a table is used to support of the sheet, the table advantageously has a flat top where the sheet can rest without induced stress caused by table top surfaced curvature. Desirably, the table top does not have sharp objects or protrusion that can scratch the sheet surface in contact therewith. For example, a table top coated with tetrafluoroethylene (Teflon®) may be advantageously used. Alternatively, a soft cloth can be used to support the sheet as well. In certain embodiments, it would be advantageous to use a material having relatively good thermal conductivity, such as aluminum or steel, and the like, to construct the bulk of the table top, with or without a Teflon® coating thereon, to support the sheet to be cut using the method of the present invention. The cooling effect provided by the such table directly in contact with a major sheet surface can facilitate the establishment of the desired stress profile beneficial for the separation of the sheet. In addition, the cooling effect provided by such table top can also help protect the devices, such as electronic and/or optical devices, formed on either or both of the sheet surfaces before cutting.

The temperature T1 of the glass sheet to be cut using the process of the present invention can vary in a broad range depending on the specific process in which the sheet is subjected to. For example, if the glass sheet is a continuous glass ribbon as formed at the bottom of the draw of a fusion downdraw or slot down-draw process, or a glass ribbon formed from a float process immediately after it exited the tin bath, the temperature of the glass sheet can be quite high, e.g., as high as 400° C. Nonetheless, a lower T1 of the glass sheet is conducive to the success of the cutting process because, as mentioned supra, the fundamental mechanism for the cutting relies on thermal gradient, and conducive to the handling of the equipment. Thus, it is desired that T1 in step (I) is not higher than 300° C., in certain embodiments not higher than 200° C., in certain embodiments not higher than 150° C., in certain other embodiments not higher than 100° C., in certain embodiments not higher than 50° C., in certain other embodiments not higher than 30° C.

As described supra, a cooling ambient atmosphere having an average temperature T3 is desired in order for the process of the present invention to oper reliably and consistently. To simplify the process, it is desired that T3≈T1. Nonetheless, it is desired that T3≤200° C., in certain embodiments T3<150° C., in certain other embodiments T3<100° C., in certain other embodiments T3<50° C., in certain other embodiments T3≤30° C., in certain other embodiments T3≤20° C. The ambient atmosphere may be air, nitrogen, helium, $CO_2$, or mixtures and combinations thereof.

In a particularly desirable embodiment of the present process, the EWB is a laser beam, such as a $CO_2$ laser beam, a frequency tripled or quadrupled YAG laser beam, a solid-state laser, or a fiber laser in the UV region, visible or infrared region. Commercial $CO_2$ laser generators at various power ratings are available at a reasonable cost. Typical borosilicate glass materials, such as the Eagle XG® glass, Jade® glass, both made and sold by Corning Incorporated, and the like, have very strong absorption at the wavelength of a typical $CO_2$ laser, and therefore can be conveniently cut by using a $CO_2$ laser. For example, $CO_2$ lasers operating at various wavelengths, such as commercially available $CO_2$ lasers at about 9.6 µm, 10.6 µm and the like may be advantageously used. For borosilicate glass materials, normally absorption at shorter wavelength of a $CO_2$ laser, such as 9.6 µm, is lower than at longer wavelength such as 10.6 µm. Those with shorter wavelengths, such as at a wavelength shorter than 10 µm, e.g., at 9.6 µm, would therefore be advantageous due to potentially less damages to the sheet material, or devices formed thereon due to less surface absorption and correspondingly deeper penetration. Laser beams, being coherent light sources, further have the advantage of being capable of easy manipulation by optical lenses, such as focusing, defocusing, beam shaping, beam energy distribution modulation, and the like. Nonetheless, an infrared beam emitted by an infrared lamp can be advantageously used in certain embodiments. Furthermore, the EWB can be a microwave beam, to the extent the sheet to be cut has sufficient absorption of the beam at the specified low thickness.

As mentioned supra, the brittle material to be cut using the present invention process can be a glass, a glass-ceramic, or a crystalline material. The present invention process is particularly advantageous for cutting thin glass sheets, such as borosilicate glass, soda lime glass, silicate glass, and the like. As mentioned supra, the success, reliability and consistency of the present invention process depends on the level of tensile stress formed in the vicinity of the glass surface, which facilitates the propagation of the surface initiation defect. The level of stress is determined by several factors, inter alia: the temperature gradient (ΔT) the glass is subjected to during step (V), the thermal conductivity (TC) and the linear coefficient of thermal expansion (CTE) of the glass material. Normally, the higher the CTE of the material, the higher the obtainable tensile stress level, all other conditions being equal. Therefore, it is desired that the brittle sheet material to be cut using the present invention process had a CTE of at least $10 \times 10^{-7}$ $K^{-1}$, in certain embodiments at least $30 \times 10^{-7}$ $K^{-1}$, in certain other embodiments at least $50 \times 10^{-7}$ $K^{-1}$, in certain other embodiments at least $70 \times 10^{-7}$ $K^{-1}$, in certain other embodiment at least $90 \times 10^{-7}$ $K^{-1}$, in certain other embodiments at least $100 \times 10^{-7}$ $K^{-1}$.

Figure 4:
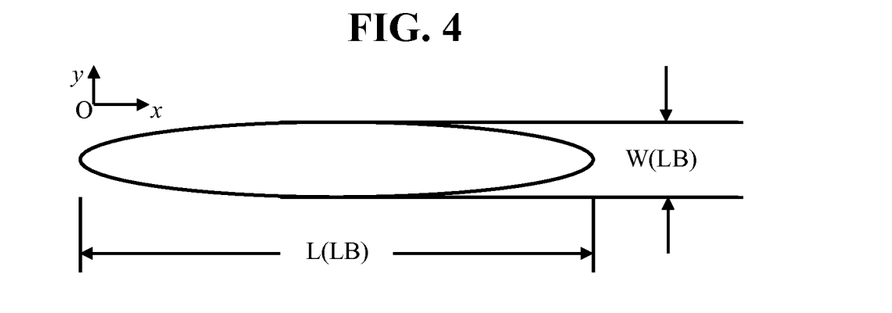
FIG. 4 is a schematic illustration of the footprint of an elliptical laser beam that can be used in certain embodiments of the aspects of the present invention.
Figure 5:
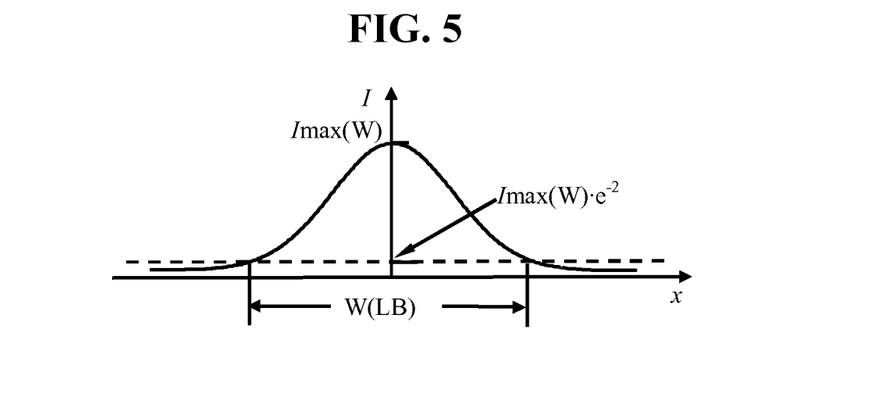
FIG. 5 is a schematic illustration of the energy intensity distribution along the length direction of the laser beam illustrated in FIG. 4 according to one embodiment.
Figure 6:
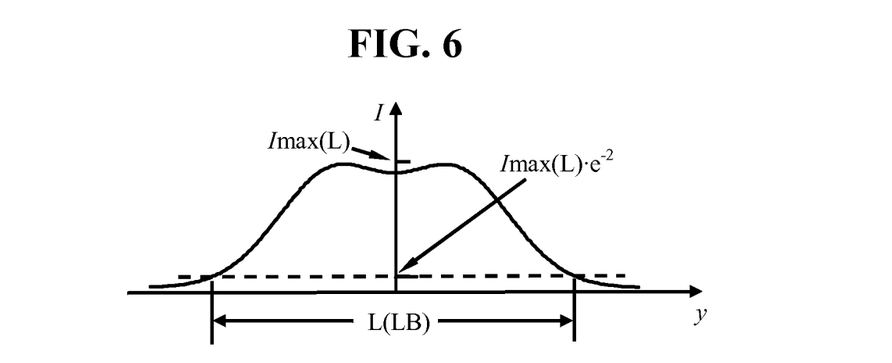
FIG. 6 is a schematic illustration of the energy intensity distribution along the width of the laser beam illustrated in FIG. 4 according to one embodiment.
Figure 7:
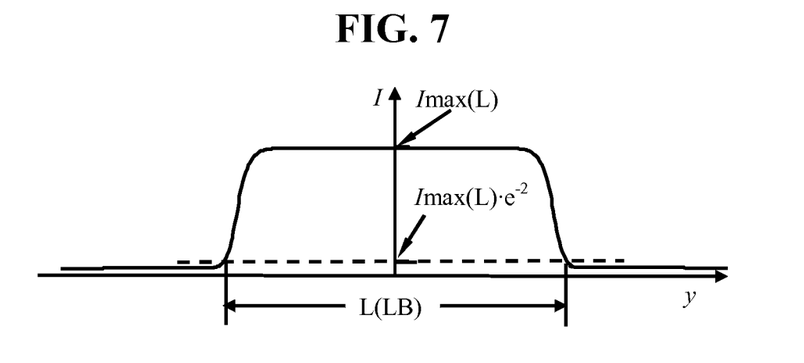
FIG. 7 is a schematic illustration of the energy intensity distribution along the width of the laser beam illustrated in FIG. 4 according to another embodiment.

At any given instant of time, when the EWB is projected to the first major surface of the brittle sheet to be cut, the EWB has a footprint on the first major surface. FIG. 4 shows a typical elliptical footprint of a laser beam having a length L(LB) and a width W(LB). Normally, the energy distribution inside the footprint exhibits a certain pattern. For example, a typical $CO_2$ laser beam can exhibit a Gaussian energy distribution along any given direction, such as the x or y direction, having a peak energy intensity in the center of the beam. In a particularly advantageous $CO_2$ laser beam, the energy intensity distribution along the x direction is substantially Gaussian with a peak intensity Imax(L), as shown in FIG. 5, and the energy intensity distribution along the y direction exhibits a D-mode, as shown in FIG. 6, or a flat-top mode, as shown in FIG. 7, with a peak intensity Imax(W). The length L(LB) of the laser beam is defined as the distance between the two power cut-off lines in the y direction where the energy intensity is $Imax(L) \cdot e^{-2}$, where e is the Euler's Number (i.e., e≈2.71828). The width W(LB) of the laser beam is defined as the distance between the two power cut-off lines in the x direction where the energy intensity is $Imax(W) \cdot e^{-2}$. In another advantageous embodiment, the EWB is a circular beam such as a circular laser beam having a substantially Gaussian energy intensity distribution along the direction of any diameter thereof. Thus, in the footprint of this beam, at the center is the peak intensity Imax, and the perimeter of the beam is defined by the line corresponding to an energy intensity of $Imax \cdot e^{-2}$. For the convenience of the description of the present invention, the footprint of an EWB used in the process of the present invention is defined as an area enclosing a peak energy intensity Imax, and a perimeter defined by the line corresponding to an energy intensity of $Imax \cdot e^{-2}$.

Where the EWB used in the process of the present invention has a circular footprint at any given instant of time, the footprint desirably has a diameter of at most 10 mm, in certain embodiments at most 8.0 mm, in certain embodiments at most 5.0 mm, in certain other embodiments at most 3.0 mm, in certain embodiments at most 1.0 mm, in certain other embodiments at most 500 μm. The smaller the diameter of the circular footprint of the EWB, the more precisely the area of the first major surface of the sheet exposed to the EWB can be controlled, hence the stress profile created by the exposure, and hence the geometry and dimension of the final perimeter of the sheet material to be cut off from the brittle sheet.

As mentioned supra, the footprint of the EWB can be substantially elliptical having a short axis aaa and a long axis bbb, wherein aaa is at most 10 mm, in certain embodiments at most 8.0 mm, in certain embodiments at most 5.0 mm, in certain other embodiments at most 3.0 mm, in certain embodiments at most 1.0 mm, in certain other embodiments at most 500 μm. An elliptical beam can be advantageously used to scan the first surface of the brittle sheet to form a relatively long, straight line in the exposed area. Likewise, a small and controlled dimension of the elliptical footprint of the EWB is conducive to more precise control of the area of the first major surface of the sheet exposed to the EWB, hence the stress profile created by the exposure, and hence the geometry and dimension of the final perimeter of the sheet material to be cut off from the brittle sheet.

In step (IV), the initiation defect can be formed on the first major surface only, the second major surface only, or on both the first and second major surfaces without forming a perforation through the thickness of the sheet, or on both first and second major surface while forming a continuous perforation through the thickness of the sheet. In certain embodiments, a continuous perforation initiation defect is advantageous because the tensile stress required to propagate the defect to the adjacent predetermined path therefrom is lower than an initiation defect that exists on the first and/or second surface only without forming a perforation. Various methods and tools can be used to form the initiation defect. For example, a scribing wheel, a contacting pin, or other mechanical device having a hard contacting tip made of, e.g., SiC, diamond, and the like, can be used to form the defect such as a scratch on either or both major surfaces of the brittle sheet such as a glass sheet. Because the overall thickness of the sheet to be cut by the present invention, at most 400 μm, is in general very low, a continuous perforation across the whole thickness of the glass sheet can be relatively easily and conveniently formed in the scratching process. In another embodiment, an electromagnetic wave beam, the same as or different from the EWB provided in step (II), can be advantageously used to create the initiation defect. For example, such initiation defect can be created by laser ablation, melting, or thermal shock.

The initiation defect may be formed prior to step (V), i.e., before the EWB is projected to the first major surface of the brittle sheet by scanning to heat the brittle sheet along the predetermined path. In this approach, step (VI) may occur during step (V), i.e., while the scanning of the EWB is being conducted, or after step (V), i.e., after the completion of the scanning of the EWB and while the brittle sheet is being cooled. Alternatively, step (IV) can be carried out during or after step (V), where step (VI), which may occur during or after step (IV), and during or after step (V). In general, it is desired that spontaneous separation does not occur prior to step (IV), as this would result in uncontrolled and inconsistent separation of the brittle sheet. The exact location of the initiation defect is controlled and can be chosen to facilitate the occurrence of step (VI) in a controllable and controlled manner.

It is desired that during step (V), the footprint or the EWB during scanning does not cover a part of the initiation defect. Thus, the initiation defect is not directly exposed to a significant amount of irradiation from the EWB. Such separation of the initiation defect from the laser footprint ensures that the final glass sheet separation path does not deviate significantly from the predetermined path, and part of the defect originally formed in the initiation defect does is not carried over to the edge of the separated glass sheet, resulting in less than desirable edge quality.

As mentioned supra, the predetermined path can form a closed loop with desired geometry and size, such as circular, rectangular, rectangular with round corner, elliptical, polygonal, star-shaped, and other complex shapes. The scanning of the EWB in a controllable and controlled manner can advantageously result in the formation of a tensile stress distribution pattern corresponding to the predetermined path, hence a subsequent separation of a piece of the sheet material with the desired geometry and size, from the mother sheet. In an alternative embodiment, the predetermined path forms a curved or straight line extending from one edge of the mother sheet of the brittle material to the other, such that after scanning of the EWB, a tensile stress pattern can be generated along the predetermined line, leading to the final, spontaneous separation of the mother sheet into two discreet sheets along the predetermined line. The process of the present invention has the capability of creating a curved line with complex geometry and shape to accommodate the need of any particular application.

Where the predetermined path forms s a closed loop, and it is the piece of sheet material within the closed loop that is desired for the end application, it is highly desired that the pre-formed initiation defect is located outside of the closed loop. On the other hand, where the piece of the sheet material outside of the closed loop having the area enclosed by the closed loop removed is the desired final sheet of material, it is highly desired that the pre-formed initiation defect is located inside the closed loop. Thus, it is envisioned that the process of the present invention can be used to form a thin sheet of brittle material, such as a glass sheet, with holes having various shapes and dimensions formed within.

Figure 8:
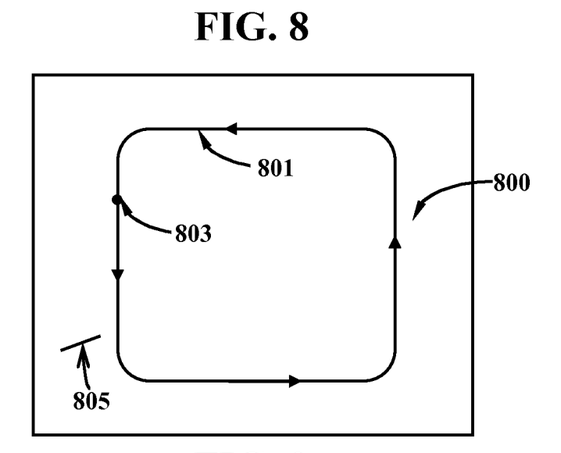
FIG. 8 is a schematic illustration of a laser cutting process according to one embodiment of the first aspect of the present invention.

In certain embodiments in the process of the present invention, during step (V), the footprint of the EWB on the first major surface comprises a center that moves in substantially the same direction at least in a complete cycle of the predetermined path. FIG. 8 illustrates an example of this embodiment, where a circular laser beam 803 comprises a center that moves along the predetermined path 801 of the first surface 800 of the glass sheet in a counterclockwise direction during a full cycle, i.e., a period in which the full length of the predetermined path 801 is scanned without duplication. Such continuous scanning of the predetermined path can be advantageously used to achieve a substantially uniform temperature, and finally a precisely controlled tensile stress pattern, along the full scanning path, as long as the scanning speed is sufficiently high. Depending on the thickness, material properties such as CTE, thermal conductivity, and the like, of the brittle sheet to be cut and the power and energy intensity distribution in the footprint of the EWB, a single scanning cycle along the predetermined path may or may not be sufficient to heat the material along the path to a sufficiently high temperature T2, such that upon cooling, a sufficient tensile stress can be generated to allow the pre-formed initiation defect 805 to propagate into the path and along the path to result in a complete, spontaneous separation along the path.

Where a single scanning cycle along the predetermined path cannot reliably create the needed temperature and tensile stress required for a successful and reliable cutting along the path, it is desirable in certain embodiments that multiple scanning cycles are carried out during step (V) before step (VI) is carried out. For example, in the embodiment illustrated in FIG. 8, the laser beam 803 may scan the closed loop

801 of the predetermined path for multiple cycles, such as 5 cycles, 10 cycles, 20 cycles, and even longer, in the same direction, such as in the counterclockwise direction in each cycle, or in different directions in the multiple cycles, such as in the counterclockwise direction in certain cycles and in clockwise direction in other cycles. For glass sheets having a thin thickness of at most 400 μm, it is highly desired that the laser beam is tuned to have a relatively low power to avoid laser ablation or heating the glass to an exceedingly high temperature which would result in direct perforation, or the formation of a heated zone with too large a width, both of which can lead to less than precisely controlled final separation of the glass sheet along the heated line, hence a less than desired degree of the control of the edge shape, edge quality, and cut piece geometry and dimension.

In cases of multiple scanning cycles, as mentioned supra, it is highly desirable the scanning speed of the EWB is sufficiently high. For example, it is desired that in step (V), the center of the footprint of the EWB has a speed of at least 1 m·s$^{-1}$, in certain embodiments at least 3 m·s$^{-1}$, in certain embodiments at least 5 m·s$^{-1}$, in certain embodiments at least 8 m·s$^{-1}$, in certain embodiments at least 10 m·s$^{-1}$, in certain embodiments at least 15 m·s$^{-1}$, in certain other embodiments at least 20 m·s$^{-1}$, in certain other embodiments at least 30 m·s$^{-1}$, in certain other embodiment at least 40 m·s$^{-1}$, in certain other embodiments at least 50 m·s$^{-1}$.

In certain specific embodiments where an EWB that is strongly absorbed by the surface of the brittle sheet to be cut, such as in the case of using a $CO_2$ laser to cut a thin borosilicate glass sheet, as mentioned above, a lower average power density of the EWB is desired. For example, in such embodiments, it is desired that in step (V), the average power density of the footprint of the EWB is from 1 to 100 W·cm$^{-2}$, in certain embodiments from 2 to 80 W·cm$^{-2}$, in certain embodiments from 3 to 70 W·cm$^{-2}$, in certain embodiments from 4 to 60 W·cm$^{-2}$, in certain other embodiments from 5 and 50 W·cm$^{-2}$. The average power irradiated to the area along the scanned path can be calculated as follows:

$$P2 = P1 \times \frac{A1}{A2},$$

where P1 is the output power of the laser beam intercepted by the first surface in joule·s$^{-1}$, A1 is the area of the stationery footprint of the laser beam, and A2 is the total scanned area in 1 second by the laser beam. Thus, in the case of a circular beam having a footprint with radius r meter, and a linear scanning speed of v m·s$^{-1}$, $$P2 = P1 \times \frac{\pi \cdot r^2}{\pi \cdot r^2 + 2 \cdot v \cdot r} = P1 \times \frac{\pi \cdot r}{\pi \cdot r + 2 \cdot v}.$$

Given that there is always some reflection loss at the surface of the sheet, the actual absorbed power P3 would then be smaller than P2.

Figure 9:
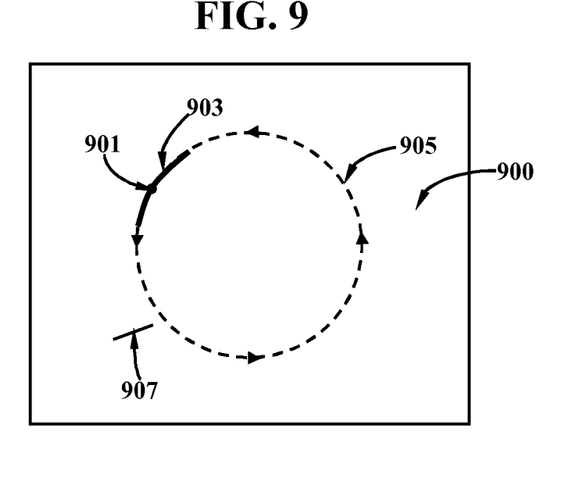
FIG. 9 is a schematic illustration of a laser cutting process according to another embodiment of the first aspect of the present invention.

In certain particularly advantageous embodiments, it is desired that in a single scanning cycle along the predetermined path, the moving direction of the center of the footprint of the EWB vary instead of stay in a single direction. Thus, in a specific embodiment, the center of the footprint of the EWB can oscillate, e.g., in a regular or predetermined manner. In certain embodiments, the oscillation of the footprint of the laser beam during scanning results in a scanning effect that is substantially equal to that of a elongated synthetic beam comprising a center that moves in substantially the same direction at least in a complete scanning cycle of the predetermined path. FIG. 9 schematically illustrates an example of this embodiment, where a circular laser 901 oscillates counterclockwise and clockwise to form an elongated, arc-shaped synthetic beam 903, which is then scanned along the predetermined circular path 905 in proximity to the pre-formed initiation defect 907, on the first surface 900 of a glass sheet. When the circular beam is observed directly, its moving direction oscillates along the path 905 back and forth. However, because the oscillation of the beam 903 is regular and precisely controlled, in a single oscillation cycle, the trace of the footprint of the laser beam 901 would result in a stationery synthetic beam 903 if the beam is not further allowed to scan along the circular path 905. If the oscillation and the scanning of the beam 901 are carried out simultaneously, the net heating effect would be substantially equal to scanning a pre-formed, non-oscillating, elongated beam 903, along the predetermined path 905. The oscillation and the scanning of the laser beam 901 can be independently and separately controlled by two different mechanisms.

For example, the oscillation of an EWB can be effectively achieved by using a piezoelectric mirror, which can turn in a predetermined direction with predetermined amplitude and frequency in response to an alternating voltage with a given amplitude and frequency, a galvometric scanning mirror, or a voice coil activated scan mirror. For two-dimension (free-shape) cutting, a pair of orthogonal galvo mirrors, for example, can be used to scan the laser beam. The beam can also be scanned by, for example, a pair of fast moving piezo mirrors. Other beam deflection techniques such as those utilizing Pockels cells, Kerr effect, etc., can also be used to achieve the desired purpose. In yet another embodiment, translation stages capable of moving the beam relative to the first surface of the sheet in the x and/or y direction can be used to scan the beam to the surface along a predetermined scanning path.

In certain particularly advantageous embodiments, both the oscillation and the scanning of the EWB can be precisely controlled and adjusted. The alteration of the oscillation amplitude, frequency and direction results in the geometry, dimension of and power distribution inside the overall footprint of the synthetic beam. For example, if the example illustrated in FIG. 8 is modified (modification not shown) to use an oscillating beam instead of a laser beam scanning in the same direction in a single scanning cycle without oscillation, the oscillation frequency, amplitude and direction can be advantageously adjusted in the four corner areas such that there is a tight fit between the shape of the synthetic beam and the round corner shape of the predetermined scanning path, and then adjusted along the four straight sides such that the synthetic beam is substantially linear, so that a final glass sheet having desired corner shape can be obtained. Where a piezoelectric mirror, galvometric mirror or a voice coil activated mirror is used to adjust the oscillation of the EWB, the oscillation of the mirror can be advantageously controlled by varying the alternating voltage supplied thereto.

Likewise, where a synthetic beam resulting from oscillating a basic beam is used, in step (V), the synthetic beam may be scanned along the predetermined path for a single or multiple scanning cycles, depending on the sheet material, sheet thickness, power of the EWB, and power distribution inside the EWB as a result of the oscillation and the original power rating of the basic beam, to achieve a reliable, spontaneous separation of the sheet along the predetermined path. Because of the use of oscillation, the sheet can be heated to a relatively high temperature T2 without overheating (which can cause ablation, perforation, and exceedingly wide heated zone), therefore enabling a consistent and reliable cutting after a single cycle of scanning of the synthetic beam along the predetermined path. Where a single scanning cycle of the synthetic beam along the predetermined path cannot reliably create the needed temperature and tensile stress required for a successful and reliable cutting along the path, it is desirable in certain embodiments that multiple scanning cycles are carried out during step (V) before cooling of the sheet is allowed to carry out step (VI). At any rate, it is believed that the use of oscillation and elongated synthetic beam can be used to achieve cutting with the use of relatively small number of scanning cycles along the predetermined scanning path. Similarly, where a synthetic beam is used by oscillating a basic, shorter beam, in certain embodiments, it is desired that the center of the synthetic beam moves at a relatively high speed during scanning to avoid overheating, e.g., in step (V), the center of the synthetic beam has a speed of at most 10 $m \cdot s^{-1}$, in certain embodiments at most 5 $m \cdot s^{-1}$, in certain other embodiments at most 1 $m \cdot s^{-1}$, in certain other embodiments at most 0.5 $m \cdot s^{-1}$, in certain other embodiment at least 0.3 $m \cdot s^{-1}$, in certain other embodiments at least 0.1 $m \cdot s^{-1}$.

In certain specific embodiments where an EWB that is strongly absorbed by the surface of the brittle sheet to be cut, such as in the case of using a $CO_2$ laser to cut a thin borosilicate glass sheet, as mentioned above, a lower power rating of the synthetic EWB is desired. For example, in such embodiments, it is desired that in step (V), the average power density of the footprint of the elongated synthetic EWB is from 1 to 100 $W \cdot cm^{-2}$, in certain embodiments from 2 to 80 $W \cdot cm^{-2}$, in certain embodiments from 3 to 70 $W \cdot cm^{-2}$, in certain embodiments from 4 to 60 $W \cdot cm^{-2}$, in certain other embodiments from 5 and 50 $W \cdot cm^{-2}$. In general, in order to achieve reliable cutting of the thin sheet material, and to achieve a high level of control of the edge shape, edge quality, cut sheet dimension and the like, it is desired that the footprint of the EWB has a small dimension in the direction orthogonal to the velocity of the center of the footprint of the EWB. Desirably, the dimension of the EWB in the direction orthogonal to the velocity of its center is not larger than half of the distance from the pre-formed initiation defect to the predetermined path. Furthermore, it is highly desirable that the location of the center of the beam is precisely controlled at any given moment by, e.g., the scanning stage, such that the center does not deviate from the center of the predetermined scanning path. Tight control of the size of the beam, the location of the center of the beam and the movement of the beam can result in a desired tensile stress pattern and dimensional control that would result in separation along a predetermined, precise cutting line.

In embodiments where the scanning involves only a single scanning cycle, the power of the EWB and/or the cutting speed along the predetermined path may be altered. For example, where a piece of rectangular sheet with round corners is cut from a mother sheet, the laser power projected to the surface of the sheet at the corner may be different from to the straight edge due to various reasons, e.g., EWB footprint moving speed change, laser power modulation, beam shape and geometry change, and incidental angle change, and the like. Therefore, both the scanning speed of the EWB footprint along the predetermined path, and the crack propagation speed along the path, can be altered in a controllable and controlled manner. For the cutting of large pieces from large mother sheet, the incidental angle change of the EWB can be significant, thus cause significantly different level of reflection loss. This factor should be taken into consideration when designing the optical scanning speed and cutting speed.

In certain embodiments of the process of the present invention, where the method is used for cutting a thin glass sheet having a strain point Tstrain, it is highly desired that in step (V), T2<Tstrain, in certain embodiments T2<Tstrain−100° C., in certain other embodiments T2<Tstrain−200° C. The closer T2 is to Tstrain, the more likely the glass sheet can deform due to heating, and the more likely the process would result in a final cut edge with high residual stress, which is highly undesirable. As is understood in the art of the glass finishing, the strength of the as-cut glass sheet is highly dependent on the edge quality. The lower the edge quality, the more the glass sheet is prone to breakage under stress. The residual stress of the edge is an important edge quality factor.

Furthermore, in certain embodiments of the process of the present invention, where the method is used for cutting a thin glass sheet having a strain point Tstrain, it is highly desired that in step (V), T2−T1≥200° C., in certain embodiments T2−T1≥300° C., in certain embodiments T2−T1≥400° C. As indicated supra, the cutting of a glass sheet using the present invention depends on the tensile stress caused by the EWB heating and the subsequent cooling effect. The temperature gradient between the heated zone (T2) and the adjacent non-heated zone (T1) is important for the creation of the required tensile stress. The higher the gradient (T2−T1), the easier it is to establish the required tensile stress without having to heat the glass sheet to an unduly high temperature T2 in step (V).

In addition, as discussed supra, it is desired that both steps (V) and (VI) are carried out in the presence of an ambient atmosphere, which serves as a medium to cool down the surfaces of the heated zone of the glass sheet during and after step (V), which is required to establish the tensile stress profile. However, forced cooling by means of a coolant jet, such as a water jet or a cooling air jet is not used in the present invention, resulting in a simple equipment setup. The non-forced, natural cooling of the ambient atmosphere is sufficient to allow the cutting process to work reliably, due to the thin thickness of the sheet and the choice of laser scanning method. The ambient atmosphere may be, e.g., air, $N_2$, He, and mixtures and combinations thereof.

However, as mentioned supra, a support table can be used to support the sheet to be cut using the method of the present invention, which also functions as a cooling medium for the heated sheet as well to achieve the desired stress profile conducive for the separation. Therefore, although it may be desirable to place the sheet in an ambient atmosphere during step (V), it is not required.

Because the pre-formed initiation defect is formed at a location with a distance from the predetermined scanning path according to the first aspect of the present invention, the pre-formed defect is not carried over to the edge of the final sheet material separated from the mother sheet. As a result, the full edge of the separate sheet is formed from the tensile stress profile established by the EWB heating and subsequent cooling. Therefore, the as-cut piece of sheet material is substantially free of major defects carried over from the pre-formed defect. The as-cut material sheet would therefore have a high edge quality and strength without the need of downstream edge polishing.

A second aspect of the present invention is a process for cutting a sheet of a brittle material having a thickness of at most 400 μm, described in connection with the first aspect supra, using a scanning synthetic EWB formed by oscillating a basic EWB. While the process of the first aspect of the present invention requires the formation of the pre-formed initiation defect at a distance from the predetermined scanning path, the process of this second aspect of the invention does not. Therefore, according to the second aspect of the present invention, in step (V), during the laser scanning of the beam, the footprint of the EWB may be chosen such that it does not pass, or pass, overlap or completely cover the preformed initiation defect. Therefore, the second aspect and the first aspect of the present invention overlap in scope.

Figure 10:
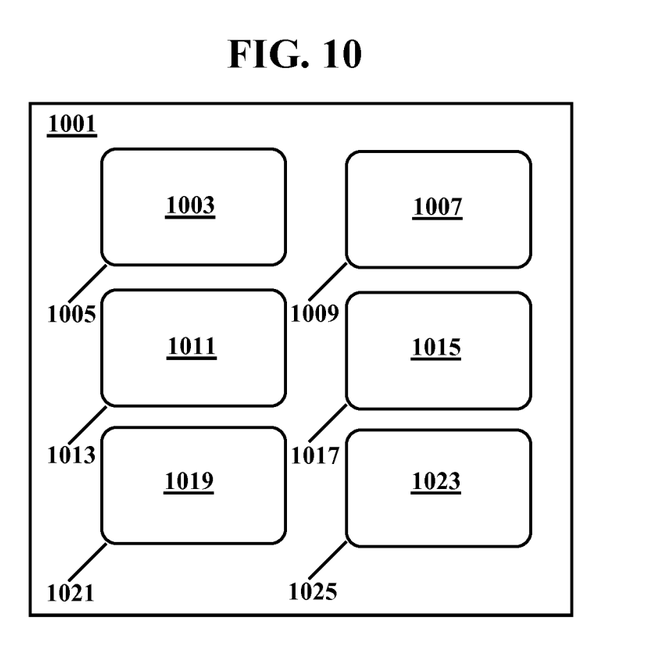
FIG. 10 is a schematic illustration of a laser cutting process according to an embodiment whereby multiple pieces are obtained from a single, large mother sheet.

The process of the present invention, either according to the first aspect or the second aspect, may be used to cut multiple pieces of sheet material from a large mother sheet. FIG. 10 illustrates an example where a method according to the first or second aspect is used to extract multiple rectangular disks with round corners from a large mother sheet. First, the predetermined laser-scanning paths 1003, 1007, 1011, 1015, 1019 and 1023 are determined on the first major surface 1001 of a large mother sheet. Second, initiation defects 1005, 1009, 1013, 1017, 1021 and 1025 are formed by, e.g., laser heating or mechanical scratching, close to, but not overlapping, the predetermined path. Third, a single or multiple laser beams, either with or without oscillation, is or are scanned to the surface 1001 along the predetermined paths, successively or simultaneously, for a sufficient period of time for each piece, to finally result in the propagation of the defects from adjacent initiation defects into the paths, along the paths, to obtain multiple rectangular pieces at the end.

The inventive process of the present invention can be used to cut sheet materials, such as glass sheets, prior to or after functional devices have already been formed on one or both major surfaces thereof. For example, the invention can be used to cut a bare glass sheet made as a TFT substrate or color filter substrate of a LCD display or a substrate for an OLED display. In this scenario, because typically functional devices such as transistors, wires (such as indium-tin-oxide conductive wires), capacitors, resistors, inductors, and the like, are formed on only one surface of the intended substrate, it is desired that the cutting of the bare glass sheet is carried out by exposing the surface on which functional devices will be formed in a down-stream fabrication step. In this manner, the opposing surface can be placed on a support, and thereby maintaining the pristine surface quality of the device side. After cutting the mother glass sheet to the intended shapes and dimensions, functional devices such as those mentioned supra, as well as mechanical-electronic-machines (MEMS), lenses, waveguides, and the like, may be formed on one or both surfaces. On the other hand, where the inventive method is used to cut a glass sheet on one major surface of which functional devices have already been made, it is desirable that the cutting is effected by exposing the surface on which such devices are not formed to the EWB, such that accidental over-heating of such functional devices is avoided.

EXAMPLES

The following non-limiting examples further illustrate the present invention.

Figure 11:
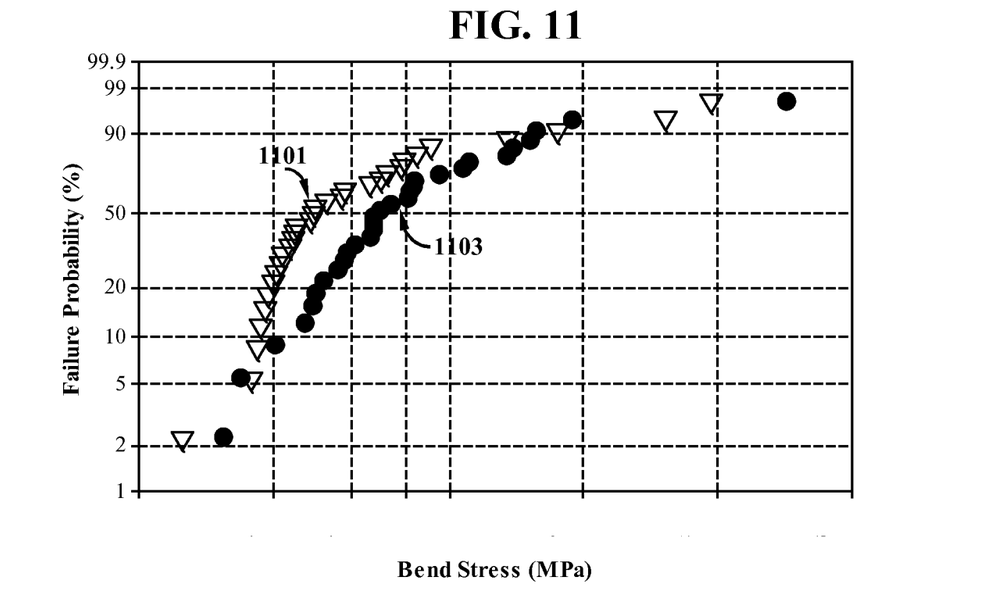
FIG. 11 is a diagram showing the failure stress of certain glass sheets as cut by using methods of certain embodiments of the present invention measured by the 2-point bending process.

Redrawn glass sheet with different glass thickness (100 µm, and 200 µm) were cut with the fast scanning circular $CO_2$ laser beam cutting method. The laser beam was line scanned over a length of ~200 mm with a scanning speed of 20,000 mm/s. The defocused laser beam has a diameter of ~1 mm and an average power density of about 18 W·cm$^{-2}$. Cut glass sheet samples, with a width of 20 mm and a length of 100 mm, was tested with the 2-point bending method for strength in terms of failure stress. FIG. 11 shows the Weibull plot of the measured result from the 2-point bending method. The minimum failure stress of the test specimens was 120 MPa for redrawn glass having a thickness of 200 µm, and 160 MPa for redrawn glass having a thickness of 100 µm. In comparison, mechanically cut samples at thicker thickness (>0.3 mm) typically have an edge failure stress of ~100 MPa in 4-point bending test. Thus, the thin glass sheets cut using the method of the present invention exhibited a high strength.

In another example, an Eagle XG® glass sheet made by Corning Incorporated was redrawn to 100 µm. Eagle XG® is known to be an alkali-free glass composition and has a CTE about $3.2 \times 10^{-6}$ K$^{-1}$. Thereafter, a circular disk having a diameter of 190 mm was cut using a circular $CO_2$ laser beam having a diameter of 1.5 mm. The beam was scanned at a speed of 25,000 mm/s. Before scanning started, a substantially linear initiation defect was formed at approximately 0.5 mm from the desired cutting line, i.e., the perimeter of the circular disk, with a direction pointing to the center of the circular disk. During scanning, the laser was running at a frequency of 38 kHz with a power output of 145 W. After the laser was turned on and an approximate scanning period of 1.5 seconds thereafter, a spontaneous crack propagation around the full circle circumference of the disk was complete.

In yet another example, redrawn Eagle XG® glass sheet having a thickness of 100 µm was cut from within to obtain multiple rectangular disks having a size of 219 mm by 156 mm with round corners using the synthetic $CO_2$ beam approach similar to that of the preceding example. The corner radius was about 8 mm. The laser beam was focused to a diameter of 1.5 mm and it was scanned at a speed of 30,000 mm/s. The laser was running at a frequency of 38 kHz with a power output of 245 W. Before scanning started, a substantially linear initiation defect was formed at approximately 0.5 mm from one of the round corners of the desired cutting line, i.e., the perimeter of the rectangular disk, with a direction pointing to the center of the disk. After the laser was turned on and a scanning period of approximately 1.5 seconds, a spontaneous crack propagation around the full perimeter was complete and a discrete rectangular disk was then extracted.

As an additional example, parts have been cut with this method from an alkali-containing glass sheet, glass code 0211 from Corning Incorporated, having a CTE of about $7 \times 10^{-6}$ K$^{-1}$ demonstrating the ability to use this approach for glass sheets with various chemical compositions and CTEs.

Figure 12:
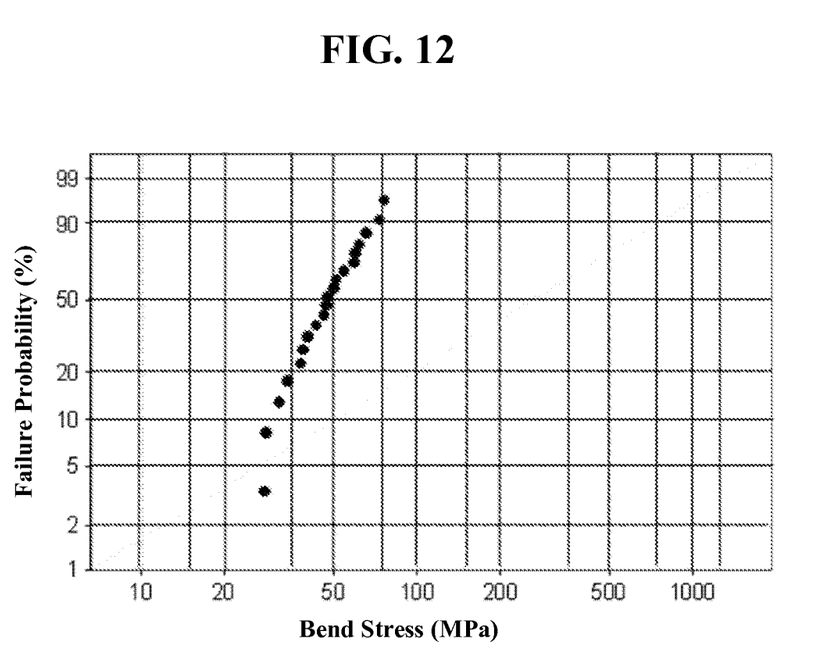
FIG. 12 is a diagram showing the failure stress of a thin glass sheet cut by using mechanical scoring.

An a comparative example, a 75 µm thick 0211 glass from Corning Incorporated was mechanically scribed to form samples appropriate for 2-point bending testing. FIG. 12 shows a Weibull plot of the test results. For the sample set tested, the minimum failure stress was observed to be 50 MPa which is significantly lower than the 2-point bend results of laser cut glass samples. This indicates that the laser cutting process produces a defect distribution along the glass edge that enables higher strength than a mechanical scribing process.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for cutting a sheet of brittle material having a thickness of at most 400 µm defined by a first major surface and a second major surface opposing the first major surface, comprising the following steps:
    (I) providing the sheet having a temperature T1;
    (II) providing an electromagnetic wave beam having a wavelength absorptive by the brittle material;
    (III) projecting the electromagnetic wave beam onto the first major surface to have a footprint on the first major surface at a given time;

(IV) providing an initiation defect on the first surface and/or the second surface;

(V) scanning the electromagnetic wave beam along a predetermined path on the first major surface to heat the brittle material along the path to a temperature $T2$ without using a cooling jet trailing the electromagnetic wave beam, said predetermined path having a distance from the initiation defect in the range of from 10 μm to 5 mm; and (VI) allowing the initiation defect to propagate into the path and extend along the path such that a portion of the brittle material sheet separates from the remainder of the sheet into a separated sheet with an edge defined by the predetermined path and wherein the initiation defect as formed during step (IV) does not extend along a length of the predetermined path that forms a corresponding length of the edge of the separated sheet.

2. A process according to claim 1, wherein in step (IV), the initiation defect is formed on the first major surface only.

3. A process according to claim 1, wherein step (IV) is carried out prior to step (V).

4. A process according to claim 1, wherein step (IV) is carried out during or immediately after the completion of step (V).

5. A process according to claim 1, wherein in step (V), the footprint of the electromagnetic wave beam does not cover a part of the initiation defect.

6. A process according to claim 1, wherein in step (V), the predetermined path forms a closed loop.

7. A process according to claim 1, wherein in step (V), the footprint of the electromagnetic wave beam on the first major surface comprises a center that moves in substantially the same direction at least in a complete scanning cycle of the predetermined path.

8. A process according to claim 7, wherein in step (V), the center of the footprint of the electromagnetic wave beam has a speed of at least at least 1 m·s$^{-1}$.

9. A process according to claim 7, wherein in step (V), the average power density of the footprint of the electromagnetic wave beam is from 1 to 100 W·cm$^{-2}$.

10. A process according to claim 1, wherein in step (V), the footprint of the electromagnetic wave beam on the first major surface forms an elongated synthetic beam comprising a center that moves in substantially the same direction at least in a complete scanning cycle of the predetermined path.

11. A process according to claim 1, wherein in step (V), the synthetic beam is formed by oscillating the electromagnetic wave beam.

12. A process according to claim 11, wherein in step (V), at least one of the following is used for oscillating the electromagnetic wave beam:
 (i) a piezoelectric mirror;
 (ii) a galvometric mirror; and
 (iii) a voice coil activated mirror.

13. A process according to claim 10, wherein in step (V), the center of the synthetic beam has a speed of at most 10 m·s$^{-1}$.

14. A process according to claim 10, wherein in step (V), the average power density of the synthetic beam is from 1 to 100 W·cm$^{-2}$.

15. A process according to claim 1, wherein the brittle material is a glass having a strain point Tstrain, and in step (V), $T2<Tstrain$.

16. A process according to claim 1, wherein in step (V), $T2-T1 \geq 200° C$.

17. A process according to claim 1, wherein both steps (V) and (VI) are carried out in the presence of an ambient atmosphere.

18. A process according to claim 1, wherein the edge of the separated sheet defined by the predetermined path is free from defects carried over from the initiation defect formed during step (IV).

19. A process according to claim 1, wherein the brittle sheet comprises functional devices formed on at least one of the first surface and the second surface during step (V).

* * * * *